Patented July 30, 1946

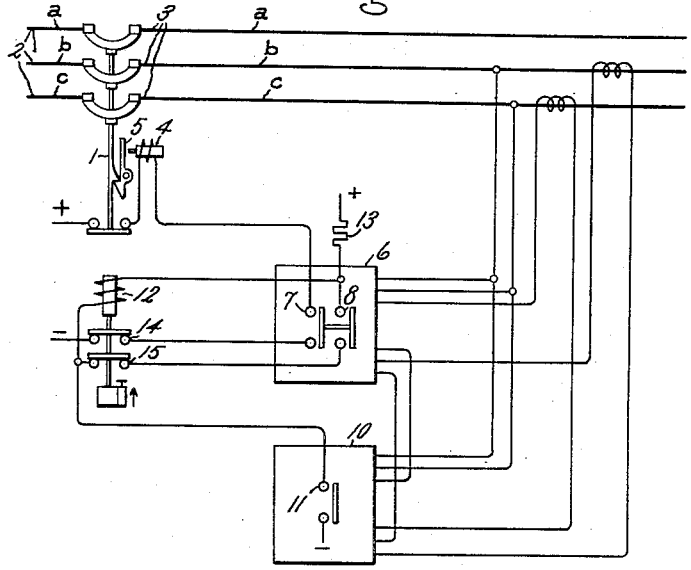
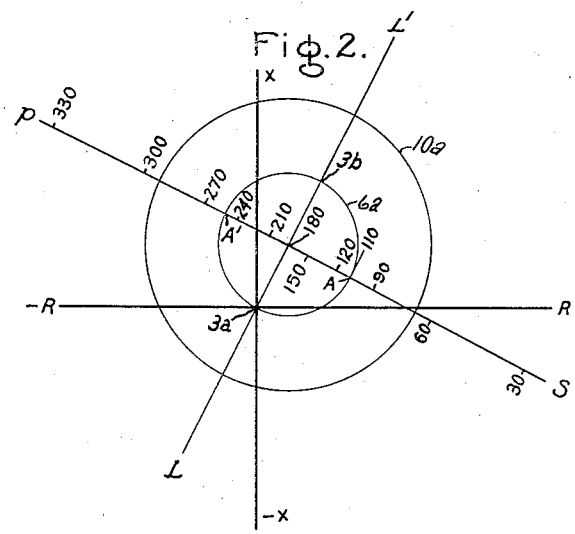

2,405,082

UNITED STATES PATENT OFFICE 2,405,082

RELAY PROTECTIVE ARRANGEMENT

Albert R. van C. Warrington, Wallingford, Pa., assignor to General Electric Company, a corporation of New York Application October 6, 1944, Serial No. 557,430

6 Claims. (Cl. 175—294)

My invention relates to relay protective arrangements for an electric power system and particularly to such an arrangement in which a directional distance relay of the well-known mho type is connected to the system so as to respond to faults which occur on the system within a predetermined distance from the point where the relay is connected. The impedance characteristic of the mho relay is such that the relay usually does not respond to maximum load conditions or power swings which do not produce out-of-step conditions. However, when an out-of-step condition does occur and the electrical center of the electric power system is so located with respect to the reach of the mho relay that the out-of-step condition effects the operation of the relay, it is sometimes desirable to provide an arrangement which distinguishes between an operation of the mho relay in response to an out-of-step condition and an operation of the relay in response to a fault. For example, it may be desirable to open the circuit interrupter controlled by the mho relay only when the relay is operated by a fault or to provide means for reclosing the circuit interrupter controlled by the mho relay when it is operated by a fault and for preventing the circuit interrupter from being reclosed when the relay is opened by an out-of-step condition. Also, in carrier current pilot relaying arrangements, it is sometimes desirable to effect the transmission of carrier current to prevent the opening of the circuit interrupters in the protected line section during an out-of-step condition and to prevent the transmission of carrier current so as to effect the opening of the circuit interrupters in the protected line section when a fault occurs thereon.

One object of my invention is to provide an improved arrangement for effecting a predetermined control operation in response to an out-of-step condition in an alternating current circuit which effects the operation of a mho relay connected to the circuit at a predetermined point in the circuit and for not effecting this predetermined control operation in response to a fault on the circuit even though the mho relay may be operated.

Another object of my invention is to provide an arrangement for distinguishing between an operation of a mho relay effected by an out-of-step condition and an operation thereof effected by a fault.

My invention will be better understood from the following description when taken in connection with the accompanying drawing, Fig. 1 of which diagrammatically illustrates a circuit interrupter control arrangement embodying my invention and Fig. 2 of which is an explanatory diagram for the embodiment shown in Fig. 1.

In the circuit interrupter control arrangement shown in Fig. 1, 1 represents a three-phase circuit interrupter which connects the phase conductors $a$, $b$ and $c$ of a three-phase line section 2 to the corresponding phase conductors of a three-phase line section 3. The circuit interrupter 1 is shown as being of the latched closed type having a trip coil 4 which, when energized, releases a latch 5 to effect the opening of the circuit interrupter 1. The energization of the trip coil 4 is controlled by a voltage restrained directional relay 6 of the type now well known in the art as a mho relay. This relay 6 is connected to the line section 3 in a manner well known in the art so that it responds to a fault on the line section 3 if the fault occurs between the line conductors $b$ and $c$ and within a predetermined distance from the circuit interrupter 1. Since the construction of such a mho relay 6 is well known in the art and constitutes no part of my present invention, this relay is shown as a rectangle containing two sets of contacts 7 and 8. The contacts 7 are connected in an energizing circuit for the trip coil 4 so as to effect the opening of the circuit interrupter 1 when the relay 6 is operated in response to a fault between the line conductors $b$ and $c$ of the line section 3.

On a resistance-reactance polar diagram, the impedance characteristic of the mho relay 6 is a circle which passes through the origin. In Fig. 2, the circle $6a$ represents the impedance characteristic of the mho relay 6 in Fig. 1, and the line $LL'$ represents the fault impedance characteristic of the power system for faults between the line conductors $b$ and $c$. The mho relay 6 is assumed to be so arranged that it develops its maximum torque at substantially the same angle as the impedance angle of the power system so that the diameter of the circle $6a$ coincides with the fault impedance characteristic $LL'$ from the point $3a$ where the mho relay 6 is located to the point $3b$ which is the most remote point from the point $3a$ that a fault on the line section 3 can effect the operation of the mho relay 6. A fault anywhere on the line section 3 between these two points $3a$ and $3b$ effects the operation of the mho relay 6.

It is well known to those skilled in the art that, in order for current to flow between two equal voltage points of an alternating current power system, the voltage at the point of supply must lead the voltage at the receiving point and that the maximum current flow occurs when the phase displacement between the voltages at these two points is 180 degrees. Therefore, during an out-of-step condition, the current that flows between two points varies from zero when the terminal voltages are in phase to a maximum value when the terminal voltages are 180 degrees apart so that the impedance seen by a relay located at any given point in the circuit connecting the terminal voltages varies from a maximum value at the instant the terminal voltages are in phase to a minimum value when the terminal voltages are 180 degrees apart. It is also well known that this minimum impedance value is equal to the fault impedance of the line between the point where the relay is located and the electrical center of the system. Therefore, if the electrical center of the system is so located with respect to the reach of the mho relay 6 in Fig. 1 that during an out-of-step condition the impedance between the point where the relay 6 is located and the electrical center of the system is within the reach of the relay 6, this relay is operated. For example, if in Fig. 2 the electrical center of the system is midway between the points $3a$ and $3b$ and the line PS represents the power swing impedance locus, the relay 6 is operated whenever the phase displacement of the terminal voltages of the system is within the range of AA', which for most power systems is a range of phase displacements which occurs only during an out-of-step condition.

In order to distinguish between an operation of the mho relay 6 which is effected by a fault and an operation thereof which is effected by an out-of-step condition, another distance relay 10 is provided which preferably has an impedance characteristic that surrounds the impedance characteristic $6a$ so that a larger portion of the impedance locus PS including the portion AA' falls within the impedance characteristic of the out-of-step relay 10. When the out-of-step relay 10 has such an impedance characteristic, it always operates before the mho relay 6 operates during any out-of-step condition that can effect the operation of the mho relay 6.

A relay which is particularly adapted for use as the out-of-step relay 10 is a modified mho relay having a torque equal to $$KEI \cos(\theta - \phi) + K'I^2 - K''E^2$$

where K, K' and K'' are constants, E and I are respectively the voltage and current of the electric circuit, $\phi$ the power factor of the electric circuit, and $\theta$ the angle between E and I for the maximum torque of the relay. When such a modified relay is designed so that its impedance characteristic $10a$ surrounds the impedance characteristic $6a$ and also is concentric therewith, as shown in Fig. 2, it is evident that whenever the relay is operated in response to an out-of-step condition, the out-of-step relay is operated prior to the relay 6 since the out-of-step relay 10 responds to smaller phase angle displacements of the terminal voltages of the system.

In the embodiment of my invention shown in Fig. 1, the contacts 11 of the out-of-step relay 10 are connected in an energizing circuit for the operating coil of a time relay 12 through an impedance 13. The time relay 12 has a set of normally closed contacts 14 which are connected in series in the energizing circuit for the trip coil 4 which is arranged to be completed by the contacts 7 of the mho relay 6. The time relay 12 also has a set of normally closed contacts 15 which are connected in series with the contacts of the mho relay 6 in a shunt circuit around the operating coil of the time relay 12 so that, if the mho relay 6 is operated before the time relay 12 completes its timing operation, the shunt circuit is completed around the operating winding of the time relay.

With the arrangement shown in Fig. 1, it is evident that when a fault occurs on the line section 3 within the reach of the mho relay 6, the impedance as seen by the relays 6 and 10 changes quickly from a value outside of their respective reaches to a value within these reaches so that both relays close their contacts substantially simultaneously. Therefore, the contacts 8 of the mho relay 6 complete through the contacts 15 of the time relay 12 the shunt circuit around the winding of the time relay 12 so that this time relay remains deenergized, and the contacts 7 of the mho relay 6 complete the energizing circuit of the trip coil 4 through the contacts 14 of the time relay 12 so as to effect the immediate opening of the circuit interrupter 1.

When an out-of-step condition occurs, however, the out-of-step relay 10 operates as soon as the phase displacement of the terminal voltages reaches a predetermined value so that the energizing circuit for the operating winding of the time relay 12 is completed through the impedance 13 and the contacts 11 of the out-of-step relay 10 for a sufficient length of time to effect the operation of the time relay 12 before the phase displacement of the terminal voltages is large enough to effect the operation of the mho relay 6. Therefore, when the relay 6 does finally operate during the out-of-step condition, the closing of the contacts 7 of the mho relay 6 does not complete the energizing circuit of the trip coil because this circuit is open at the contacts 14 of the time relay 12, and the closing of the contacts 8 of the mho relay 6 does not complete a shunt circuit around the winding of the time relay 12 because this shunt circuit is open at the contacts 15 of the relay 12. From Fig. 2, it will be evident that during an out-of-step condition not only does the mho relay 6 close its contacts 7 and 8 after the out-of-step relay 10 closes its contacts 11, but the mho relay 6 also opens its contacts 7 and 8 before the relay 10 opens its contacts 11. Therefore, any fault which is within the reach of the mho relay 6 effects the immediate opening of the circuit interrupter 1, but no opening of the circuit interrupter occurs when the mho relay 6 is operated by an out-of-step condition.

While I have shown only one mho relay 6 and one blocking relay 10 in a single-phase circuit, in practice similar mho relays 6 and similar blocking relays 10 may be connected to the three-phase line section 3 in each of the other two phases so as to effect respectively the completion of an energizing circuit for the trip coil 4 in response to a fault between the line conductors $a$ and $c$ and in response to a fault between the line conductors $a$ and $b$.

Such an arrangement would be sure to operate correctly under any combined fault and power swing condition. However, I have discovered that only two blocking relays are needed on a three-phase circuit and in certain cases a single blocking relay is sufficient.

Since protective relays for phase faults require delta potential and delta current for accurate distance measurement, the locus of the impedances seen by the relays in the different phases at a given point on the system, when only a power swing exists on the system, is a straight line at right angles to the system impedance vector on a resistance-reactance polar diagram for the system. These lines intersect at a point located at a distance from the origin equal to the system impedance between the electrical center of the system and the point where the relays are connected to the system.

When a fault as well as a swing are present on the system, the impedances as seen by the distance relays in the different phases are different. In the faulted phase, the swing components of current and potential cancel out and the associated distance relay immediately measures only the line impedance between the relay and the fault. In each of the other two phases, the locus that appears on the resistance-reactance diagram as a straight line when no fault is present is bent around into a circle so that each of the distance relays connected to these phases sees a gradually changing impedance as long as the swing or out-of-step condition exists. Therefore, it is evident that on a three-phase system only one single-phase blocking relay would not operate satisfactorily during a combined fault and power swing condition if it happened to be connected to the faulted phase because there would be no gradual change of impedance which is necessary in order to have my improved relay arrangement operate satisfactorily. Two single-phase blocking relays respectively connected to different phases, however, are sufficient because during a combined fault and power swing condition at least one of these relays will always be connected to an unfaulted phase in which a gradual impedance change occurs when a fault exists between any two phase conductors of the system.

In systems where high-speed tripping occurs for all faults, the blocking relays can be reduced to one because the fault will be quickly removed and then the power swing characteristic will be the same in each phase.

Instead of using two single-phase modified mho relays for blocking relays on a three-phase circuit, a single polyphase modified mho relay may be used. Such a unit, however, would be less accurate than two or three single-phase units and would vary the size of its circular characteristic according to the proximity of the fault.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. An arrangement for effecting a predetermined operation in response to an out-of-step condition in an electric circuit which effects the operation of a mho relay connected to said circuit at a predetermined point in said circuit comprising a modified mho relay having such an impedance characteristic that when said modified mho relay is connected to said circuit at said point said modified mho relay is always operated before said mho relay during an out-of-step condition in said circuit, and means for effecting said predetermined operation in response to said modified mho relay being operated for a predetermined time interval prior to the operation of said mho relay.

2. An arrangement for effecting a predetermined operation in response to an out-of-step condition in an electric circuit which effects the operation of a mho relay connected to said circuit at a predetermined point in said circuit and for not effecting said operation in response to a fault on said circuit which effects the operation of said relay comprising a modified mho relay having such an impedance characteristic that when said modified mho relay is connected to said circuit at said point said modified mho relay is always operated before said mho relay during an out-of-step condition in said circuit, timing means responsive to the operation of said modified mho relay for effecting said predetermined operation, and means responsive to the operation of said mho relay for rendering said timing means inoperative to effect said predetermined operation.

3. An arrangement for effecting a predetermined operation in response to an out-of-step condition in an electric circuit which effects the operation of a mho relay connected to said circuit at a predetermined point in said circuit and for not effecting said operation in response to a fault on said circuit which effects the operation of said relay comprising a modified mho relay having such an impedance characteristic that when said modified mho relay is connected to said circuit at said point said modified mho relay is always operated before said mho relay during an out-of-step condition in said circuit, a time relay for effecting said predetermined operation, means responsive to the operation of said modified mho relay for initiating the operation of said time relay, and means responsive to the operation of said mho relay for rendering said time relay inoperative.

4. An arrangement for distinguishing between an operation of a mho relay which is effected by a fault on an alternating current circuit to which the relay is connected and an operation of the relay which is effected by an out-of-step condition on said circuit comprising a modified mho relay having an impedance characteristic which is approximately concentric with the impedance characteristic of said mho relay, and means responsive to a predetermined one of said relays being operated for a predetermined time interval prior to the operation of the other relay.

5. An arrangement for distinguishing between an operation of a mho relay which is effected by a fault on an alternating current circuit to which a relay is connected and an operation of the relay which is effected by an out-of-step condition on said circuit comprising a modified mho relay having an impedance characteristic which is concentric with and larger than the impedance characteristic of said mho relay, and means responsive to said modified mho relay being operated for a predetermined time interval prior to the operation of said mho relay.

6. An arrangement for distinguishing between an operation of a mho relay which is effected by a fault on an alternating current circuit to which a relay is connected and an operation of the relay which is effected by an out-of-step condition on said circuit comprising a modified mho relay having an impedance characteristic which is larger than and which completely encircles the impedance characteristic of said mho relay, and means responsive to said modified mho relay being operated for a predetermined time interval prior to the operation of said mho relay.

ALBERT R. van C. WARRINGTON.